United States Patent
Bevan et al.

(10) Patent No.: US 10,601,455 B2
(45) Date of Patent: Mar. 24, 2020

(54) MITIGATING PASSIVE INTERMODULATION INTERFERENCE IN A MIMO WIRELESS NETWORK

(71) Applicant: AceAxis Limited, Harlow, Essex (GB)

(72) Inventors: David Damian Bevan, Harlow (GB); Fiona Wilson, Harlow (GB); Simon Gale, Harlow (GB)

(73) Assignee: AceAxis Limited, Harlow (GB)

( * ) Notice: Subject to any disclaimer, the term of this patent is extended or adjusted under 35 U.S.C. 154(b) by 0 days.

(21) Appl. No.: 16/212,191

(22) Filed: Dec. 6, 2018

(65) Prior Publication Data
US 2019/0109611 A1  Apr. 11, 2019

Related U.S. Application Data

(63) Continuation of application No. PCT/GB2017/051654, filed on Jun. 7, 2017.

(30) Foreign Application Priority Data

Jun. 7, 2016 (GB) .................................. 1609930.1

(51) Int. Cl.
*H04L 1/02* (2006.01)
*H04B 1/10* (2006.01)
(Continued)

(52) U.S. Cl.
CPC ......... *H04B 1/1081* (2013.01); *H04B 1/1027* (2013.01); *H04B 1/123* (2013.01);
(Continued)

(58) Field of Classification Search
CPC ....... H04L 1/0618; H04L 1/06; H04B 1/1036; H04B 1/123; H04B 1/1027
(Continued)

(56) References Cited

U.S. PATENT DOCUMENTS

| 10,237,109 B2* | 3/2019 | Wilson | H04B 1/123 |
| 2002/0161560 A1* | 10/2002 | Abe | H04L 1/005 |
| | | | 702/196 |
| 2014/0036969 A1* | 2/2014 | Wyville | H04B 1/38 |
| | | | 375/219 |
| 2015/0244414 A1* | 8/2015 | Yu | H04B 1/525 |
| | | | 455/73 |

(Continued)

FOREIGN PATENT DOCUMENTS

| GB | 2531357 A | 7/2009 |
| WO | 2015011459 A1 | 1/2015 |

(Continued)

OTHER PUBLICATIONS

International Search Report and Written Opinion dated Aug. 31, 2017 for PCT Application No. PCT/GB2017/051654.
(Continued)

*Primary Examiner* — Khai Tran
(74) *Attorney, Agent, or Firm* — EIP US LLP

(57) ABSTRACT

Methods and apparatus are disclosed for processing interference due to passive non-linear products of transmitted signals in a wireless network, and more specifically, but not exclusively, to reduction of interference caused to a receiver due to passive intermodulation (PIM) products generated from at least a first Multiple Input Multiple Output (MIMO) signal comprising first and second MIMO component streams at a first carrier frequency. In other scenarios, there may be two or more carrier frequencies combining to cause PIM, and each carrier frequency may have two or more MIMO component streams.

13 Claims, 14 Drawing Sheets

(51) Int. Cl.
  *H04B 1/12* (2006.01)
  *H04B 17/391* (2015.01)
  *H04B 7/0426* (2017.01)
  *H04J 11/00* (2006.01)
  *H04B 7/08* (2006.01)

(52) U.S. Cl.
  CPC ....... *H04B 7/0426* (2013.01); *H04B 17/3912* (2015.01); *H04J 11/0063* (2013.01); *H04B 7/0885* (2013.01)

(58) Field of Classification Search
  USPC ........................................ 375/267, 260, 130
  See application file for complete search history.

(56) References Cited

U.S. PATENT DOCUMENTS

2015/0257165 A1    9/2015  Gale et al.
2016/0006468 A1*   1/2016  Gale ..................... H04B 1/123
                                                    455/296

FOREIGN PATENT DOCUMENTS

WO    2009082084 A1    4/2016
WO    2016059424 A1    4/2016

OTHER PUBLICATIONS

Combined Search and Examination Report dated Nov. 26, 2016 for Application No. GB1609930.1.

* cited by examiner

| | |
|---|---|
| S14.1 | Generate a first simulated PIM component to simulate a first component of the PIM products by applying a first nonlinear PIM simulation function to a linear combination of a plurality of baseband streams, the plurality of baseband streams comprising at least a first baseband stream representing the first MIMO component stream, and a second baseband stream representing the second MIMO component, wherein the first baseband stream is combined with the second baseband stream in a first amplitude and phase relationship |
| S14.2 | generate a second simulated PIM component to simulate a second component of the PIM products by applying a second nonlinear PIM simulation function to a linear combination of said plurality of baseband streams, wherein the first baseband stream is combined with the second baseband stream in a second amplitude and phase relationship, different from the first amplitude and phase relationship |
| S14.3 | reduce the interference in the received waveform by subtraction of the first and second simulated PIM components |

Figure 14

MITIGATING PASSIVE INTERMODULATION INTERFERENCE IN A MIMO WIRELESS NETWORK

CROSS-REFERENCE TO RELATED APPLICATIONS

This application is a continuation of International Application No. PCT/GB2017/051654, filed Jun. 7, 2017, which claims priority to GB Application No. GB1609930.1, filed Jun. 7, 2016, under 35 U.S.C. § 119(a). Each of the above-referenced patent applications is incorporated by reference in its entirety.

BACKGROUND OF THE INVENTION

Field of the Invention

The present invention relates generally to methods and apparatus for processing interference due to passive non-linear products of transmitted signals in a wireless network, and more specifically, but not exclusively, to reduction of interference caused to a receiver due to passive intermodulation (PIM) products generated from at least a first Multiple Input Multiple Output (MIMO) signal comprising first and second MIMO component streams at a first carrier frequency. In other scenarios, there may be two or more carrier frequencies combining to cause PIM, and each carrier frequency may have two or more MIMO component streams.

Description of the Related Technology

Non-linear products may be generated in a wireless network when one or more signals are transmitted along a signal path including a component having a non-linear transmission characteristic; these products typically differ in frequency from the signal or signals from which they were generated, and may potentially cause interference to other signals. The generation of non-linear products is becoming a problem of increasing importance in modern wireless communication systems, and in particular cellular wireless systems, since the radio frequency spectrum available has been steadily expanded as additional bands have become available, and the pattern of allocation of uplink and downlink bands within the available spectrum for use by various cellular systems, such systems using GERAN (GSM EDGE Radio Access Network), UTRAN (UMTS Terrestrial Radio Access Network) and E-UTRAN (Evolved UMTS Terrestrial Radio Access Network) radio access networks, and by various operators, is complex and territorially dependent. In this environment, and in particular at a cellular radio base station, it is likely that circumstances arise in which non-linear products generated from transmitted carriers in one or more downlink bands would fall within an uplink band in which signals are received at the base station. Non-linear products generated by non-linear characteristics of active components such as power amplifiers may generally be dealt with at a design stage by appropriate frequency management and filtering, but non-linear products caused by non-linear characteristics of passive components, for example passive intermodulation (PIM) products, may prove more difficult to manage. Many passive components may exhibit a non-linear transmission characteristic to some degree, for example due to an oxide layer at a metal to metal contact, and the non-linear characteristic may develop with time as an ageing process of the component. For example antenna components, which are external to a receiver but connected to it, may generate PIM to some extent. Furthermore, PIM may be caused by components in the signal path between the transmitter and the receiver that are external to the transceiver equipment and which may be outside the operator's control, such as metallic objects on the antenna tower or other objects in the signal path through the propagation environment, such as fences; this is known as the "rusty bolt" effect.

Increasingly, cellular and other wireless systems use MIMO (Multiple Input, Multiple Output) radio frequency transmission, in which a node such as a base station or a user equipment may have more than one antenna and may transmit and/or receive different signal component streams from each antenna at the same frequency. The node may be in communication with another node which also has more than one antenna and which may also be arranged to transmit and/or receive different signal component streams from each antenna at the same frequency. This may enable an increase in system capacity in some propagation conditions by allowing multiple signal component streams to be transmitted between the nodes at the same frequency. However, if two or more MIMO signal component streams impinge upon one or more passive non-linear devices, then the characteristics of interference received at a receiver can become complicated. It may be desired to generate a replica of the PIM for use in cancelling the PIM interference in a received signal, as for example is described in the applicant's patent GB2502279. However, a simple replica may not be a good representation of the interference received in a complicated interference environment, and as a result cancellation performance may be limited.

It is an object of the invention to address at least some of the limitations of the prior art systems.

SUMMARY

In accordance with a first aspect of the present invention there is provided a method of processing interference in a waveform received at the input of a receiver in a wireless network, the interference comprising PIM (Passive Intermodulation) products generated from at least a first MIMO (Multiple Input Multiple Output) signal comprising at least a first and second MIMO component stream at a first carrier frequency, the method comprising:
  generating a first simulated PIM component to simulate a first component of the PIM products by applying a first nonlinear PIM simulation function to a linear combination of a plurality of baseband streams, the plurality of baseband streams comprising at least a first baseband stream representing the first MIMO component stream, a second baseband stream representing the second MIMO component stream, wherein the first baseband stream is combined with the second baseband stream in a first amplitude and phase relationship;
  generating a second simulated PIM component to simulate a second component of the PIM products by applying a second nonlinear PIM simulation function to a linear combination of said plurality of baseband streams, wherein the first baseband stream is combined with the second baseband stream in a second amplitude and phase relationship, different from the first amplitude and phase relationship; and
  reducing the interference in the received waveform by subtraction of the first and second simulated PIM components.

This allows cancellation of interference caused by two or more sources of PIM at different locations, at which the MIMO component streams may arrive with a different phase and amplitude relationship.

In an embodiment of the invention, the method comprises:
  generating the first simulated PIM component by a process comprising applying a first propagation simulation function to the first baseband stream; and
  generating the second simulated PIM component by a process comprising applying a second propagation simulation function to the first baseband stream,
  wherein the first propagation simulation function is different from the second propagation simulation function.

This allows cancellation of interference caused by two or more sources of PIM at different locations, at which the MIMO component streams may arrive after transmission through a different propagation characteristic.

In an embodiment of the invention, at least one of the first and second propagation simulation functions comprises a delay.

This allows cancellation of interference caused by two or more sources of PIM at different locations, at which the MIMO component streams may arrive with a different delay.

In an embodiment of the invention, the first propagation simulation function comprises:
  delaying the first baseband stream by a first delay;
  delaying a copy of the first baseband stream by a second delay;
  combining the first baseband stream with the copy of the first baseband stream with a first phase and amplitude relationship,
  and the second propagation simulation function comprises:
  delaying the second baseband stream by a third delay;
  delaying a copy of the second baseband stream by a fourth delay; and
  combining the second baseband stream with the copy of the second baseband stream with a second phase and amplitude relationship.

This allows cancellation of interference caused by two or more sources of PIM at different locations, at which a MIMO component stream of the first carrier may arrive with a different delay spread due to multipath propagation at each source of PIM.

In an embodiment of the invention, at least the first propagation simulation function is a transversal filter function.

This allows for efficient simulation of propagation effects.

In an embodiment of the invention, the method comprises:
  generating the first simulated PIM component comprises applying a third propagation simulation function to the second baseband stream; and
  generating the second simulated PIM component comprises applying a fourth propagation simulation function to the second baseband stream,
  wherein the third propagation simulation function is different from the fourth propagation simulation function.

This allows cancellation of interference caused by two or more sources of PIM at different locations, at which the second MIMO component streams of the first carrier may arrive with a different delay spread due to multipath propagation.

In an embodiment of the invention, generating the first simulated PIM component comprises applying a fifth propagation simulation function to the output of the first nonlinear PIM simulation function, and generating the second simulated PIM component comprises applying a sixth propagation simulation function to the output of the second nonlinear PIM simulation function,
  wherein the fifth propagation simulation function is different from the sixth propagation simulation function.

This allows cancellation of interference caused by two or more sources of PIM at different locations, generating PIM products which are received at the receiver after transmission through a different propagation characteristic.

In an embodiment of the invention, the interference comprising PIM (Passive Intermodulation) products is generated from signals comprising a second signal stream at a second carrier frequency, and said plurality of baseband streams comprises at least a third baseband stream, representing at least part of the second signal stream, offset in frequency at baseband with respect to the first and second baseband streams.

This allows cancellation of PIM generated between carriers at the first and second frequency.

In an embodiment of the invention, the second signal stream comprises at least a third and fourth MIMO component stream at the second carrier frequency.

This allows cancellation of PIM where the second carrier also has MIMO component streams.

In an embodiment of the invention, the PIM products are generated by intermodulation between signal components having the first carrier frequency.

The simulated PIM simulating these products may be selected by the use of an appropriate filter after the PIM simulation function.

In an embodiment of the invention, the PIM products are cross-modulated by the second signal stream and at least the third baseband stream is used to cross-modulate the amplitude of the simulated PIM components.

The simulated PIM simulating these products may be selected by the use of an appropriate filter after the PIM simulation function.

In an embodiment of the invention, the nonlinear PIM simulation function is a function of the form $|A|^{p-m}A^m$, where A is a time sample of the linear combination of baseband streams and p is an exponent value of a PIM product and m is a sum of frequency coefficients of the PIM product.

This allows an effective PIM simulation.

In accordance with a second aspect of the invention, there is provided apparatus configured to perform the method of aspects of the invention.

Further features and advantages of the invention will be apparent from the following description of preferred embodiments of the invention, which are given by way of example only.

BRIEF DESCRIPTION OF THE DRAWINGS

FIG. 14 is a flow diagram of a method of cancelling MIMO PIM interference in an embodiment of the invention.

DETAILED DESCRIPTION OF CERTAIN INVENTIVE EMBODIMENTS

Figure 1:
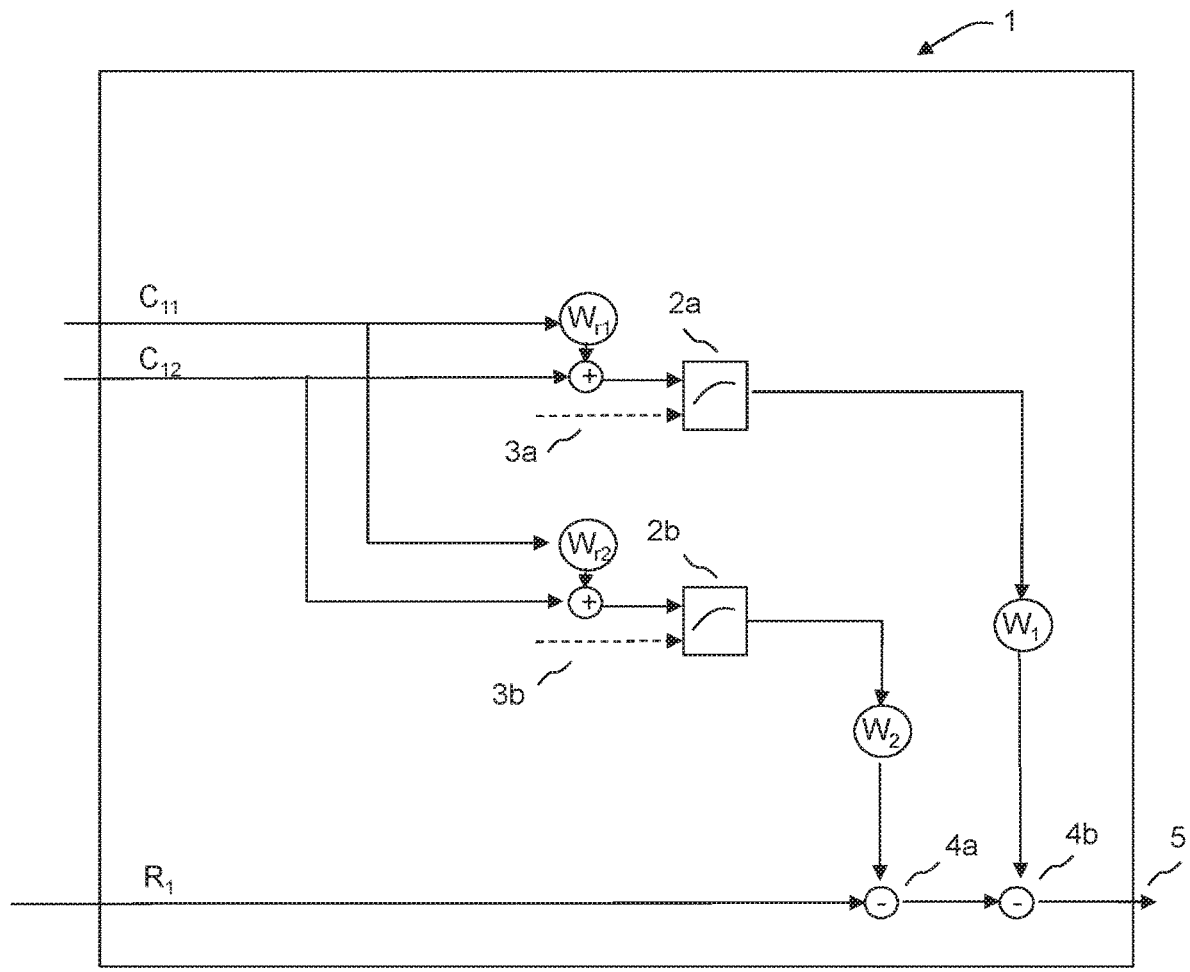
FIG. 1 is a schematic diagram illustrating generation of first and second simulated PIM components, each based on at least a first and second baseband stream representing a respective MIMO component stream, combined with a different phase and amplitude relationship for each simulated PIM component, in an embodiment of the invention.

By way of example, embodiments of the invention will now be described in the context of detection and reduction of interference caused by passive intermodulation (PIM) products, in cellular wireless networks such as GSM, 3G (UMTS) and LTE (Long Term Evolution) networks comprising GERAN, UTRAN and/or E-UTRAN radio access networks, but it will be understood that embodiments of the invention may relate to other types of radio access network, for example IEEE 802.16 WiMax systems, and that embodiments of the invention are not restricted to cellular wireless system.

In a first example of a problem solved by embodiments of the invention, PIM is generated from MIMO signals transmitted at different carrier frequencies $f_1$ and $f_2$. In other examples, the PIM may be generated by intermodulation between parts of the signals at a single carrier frequency, for example by intermodulation between subcarriers of an OFDM (orthogonal frequency division multiplexing) signal. For the case of PIM generation from two carrier frequencies, each MIMO signal may comprise two or more MIMO component streams $C_{11}$, $C_{12}$; $C_{21}$, $C_{22}$, each component stream typically carrying different data at the same carrier frequency, to increase data capacity. The MIMO signals may be transmitted by a radio head, which is an electronic device comprising a transceiver which is typically mounted on a tower at a base station of a cellular wireless system. Particularly in an urban area, the transmitted signals may impinge upon various sources of PIM at various distances from the radio head, at various orientations. The PIM sources may be for example roof-top metallic objects, potentially on various different buildings. Each MIMO component stream at a given carrier frequency is typically transmitted from a different antenna element at the radio head, the antenna elements typically being spatially separated from each other and/or differing in polarization. The MIMO component streams may be arranged to provide diversity and/or beamforming capability. The signals propagating from the radio head to the PIM sources may suffer multi-path distortion due to reflection, for example, from buildings. Similarly, PIM products propagating from the PIM sources back to the radio head in a receive band for the radio head may also suffer multi-path distortion. The potentially complicated combination of PIM sources, MIMO streams, and the multi-path environment may limit the performance of a simple PIM canceller.

The PIM is typically generated in the one or more PIM sources due to a passive non-linear characteristic, albeit a relatively weak non-linear characteristic. The non-linear characteristic may be caused by an oxide layer between metallic parts, for example in a device in the propagation environment outside the radio head, and/or in an antenna of the radio head. The device may be impinged upon by the transmitted signals, and then the generated PIM may be retransmitted by the device. The generation of PIM is by radio frequency mixing between, in this example, the two MIMO signals at frequencies $f_1$ and $f_2$. As a result of the radio frequency mixing, PIM product may be generated at various frequencies, but it is PIM products which fall at a frequency $f_3$ in a receive band of the cellular wireless system which may be problematic, since the PIM may be received as interference. In order to cancel the interference, the radio head may be connected to a PIM canceller unit 1 which reduces the PIM in the received waveform by generating simulated PIM and subtracting this vectorially from the received waveform. The simulated PIM may be generated by obtaining respective data streams, typically at baseband, which represent the MIMO component streams of the two or more MIMO signals which caused the PIM. These data streams, also referred to as baseband streams, may be obtained from a baseband data link, typically an industry standard CPRI link. The data streams may be operated on by a PIM simulation function to produce simulated PIM.

In an embodiment of the invention, two or more simulated PIM components are generated, each based on at least a first and second baseband stream representing a respective MIMO component stream. The baseband streams are combined with a different phase and amplitude relationship for each simulated PIM component. This allows cancellation of interference caused by two or more sources of PIM, for example at different locations, at which the MIMO component streams may arrive with a different phase and amplitude relationship. This allows effective cancellation of PIM in complicated interference environments, particularly in urban areas.

The phase and amplitude relationship between MIMO component streams at the same carrier frequency may be referred to as "MIMO-mix". It has been found that the MIMO-mix used to generate each simulated PIM component may be advantageously arranged to match the MIMO-mix of the PIM component streams as they impinged upon the respective PIM source to generate the PIM interference, in order to generate realistic simulated PIM. It has been found that it is the resultant vector from the superposition of the MIMO component streams at one carrier frequency, potentially mixed with the resultant vector from the superposition of the MIMO component streams at another carrier frequency, which is important in characterizing PIM. If the MIMO-mix of one or both MIMO signals is incorrect, then the simulated PIM may be a poor replica, so that correlation of the simulated PIM with the received PIM would be expected to be poor and also the cancellation of the received PIM using the simulated PIM would be expected to be poor. It has been found that it may be advantageous for the MIMO-mix to be different for each simulated PIM component, in particular in environments which may have multiple sources of PIM.

FIG. 1 shows a PIM canceller 1 in an embodiment of the invention for processing interference in a waveform received at the input of a receiver in a wireless network. The interference comprises PIM products generated from at least a first MIMO signal comprising at least a first $C_{11}$ and second $C_{12}$ MIMO component stream at a first carrier frequency $f_1$. As shown in FIG. 1, a first simulated PIM component is generated to simulate a first component of the PIM products by applying a first nonlinear PIM simulation function 2a to a linear combination of a plurality of baseband streams, the plurality of baseband streams comprising at least a first baseband stream $C_{11}$ representing the first MIMO component stream, a second baseband stream $C_{12}$ representing the second MIMO component. The plurality of baseband streams may also comprise further baseband streams 3a, for example representing further MIMO component streams. The first baseband stream $C_{11}$ is combined with the second baseband stream $C_{12}$ in a first amplitude and phase relationship.

As shown in FIG. 1, the first amplitude and phase relationship may be applied as a weighting function $W_{r1}$. The weighting function may be determined by a trial of candidate values, and correlation of the resulting PIM simulation function with the received waveform. When a correlation is found, the weighting function may be assumed to be correct. Well known search methods such as weight perturbation may be used to find an initial value for the weight on system start-up, and then to track changes in the value, which may be caused by changes in the propagation environment. Other methods of determining the weight value may be used.

The simulated PIM component may be generated in a PIM simulation function by combining data streams representing respective MIMO component streams and applying a non-linear function to the combined streams. The non-linear PIM simulation function may be, for example, of the form $|A|^{n-1}A$, where A is a combined baseband signal comprising the component streams and n is an exponent value chosen to match the PIM product of interest. A typical value of n is 3, for third order PIM products generated at frequencies 2f1-f2 or 2f2-f1.

The nonlinear PIM simulation function may more generally be a function of the form $|A|^{p-m}A^m$, where A is a time sample of the linear combination of baseband streams and p is an exponent value of a PIM product and m is a sum of frequency coefficients of the PIM product. So, taking the example of a PIM product as an intermodulation product between signals at carrier frequencies $f_1$ and $f_2$ at a frequency of $2f_1$-$f_2$, the factor m would be 1, because the frequency coefficients of $f_1$ and $f_2$ are 2 and −1 respectively. In this case, for an exponent value of 3, the non-linear function would be $|A|^2A$. A non-linear PIM simulation function may be a combination of non-linear functions of different exponent value. Applying a PIM simulation function by passing a composite baseband representation of more than one data stream through a non-linear operation, is described, for example, in the published patent application GB2517298.

As can be seen in FIG. 1, a second simulated PIM component is also generated to simulate a second component of the PIM products by applying a second nonlinear PIM simulation function 2b to a linear combination of the baseband streams, which may include further baseband streams 3b, for example representing further MIMO component streams, the first baseband stream being combined with the second baseband stream in a second amplitude and phase relationship, different from the first amplitude and phase relationship. As shown in FIG. 1, the second amplitude and phase relationship may be applied as a weighting function $W_{r2}$, which may be determined by a similar method as for $W_{r1}$.

Further simulated PIM components may be generated in a similar manner.

The interference in the received waveform may then be reduced by subtraction of at least the first and second simulated PIM components, as shown by the weighting $W_1$, $W_2$ and combination 4a, 4b functions. The weighting functions $W_1$, $W_2$ may be determined by correlating the respective simulated PIM with the received waveform $R_1$, also at baseband, and directly determining a phase and amplitude relationship which would reduce the PIM in the received waveform. Alternatively, an iterative approach may be used based on a correlation of the combination of the received waveform with the simulated PIM, using well-known power minimization algorithms interference is reduced at the output 5 of the PIM canceller.

The subtraction of the first and second simulated PIM components allows cancellation of interference caused by two or more sources of PIM at different locations more effectively than the subtraction of a single simulated PIM component.

Figure 2:
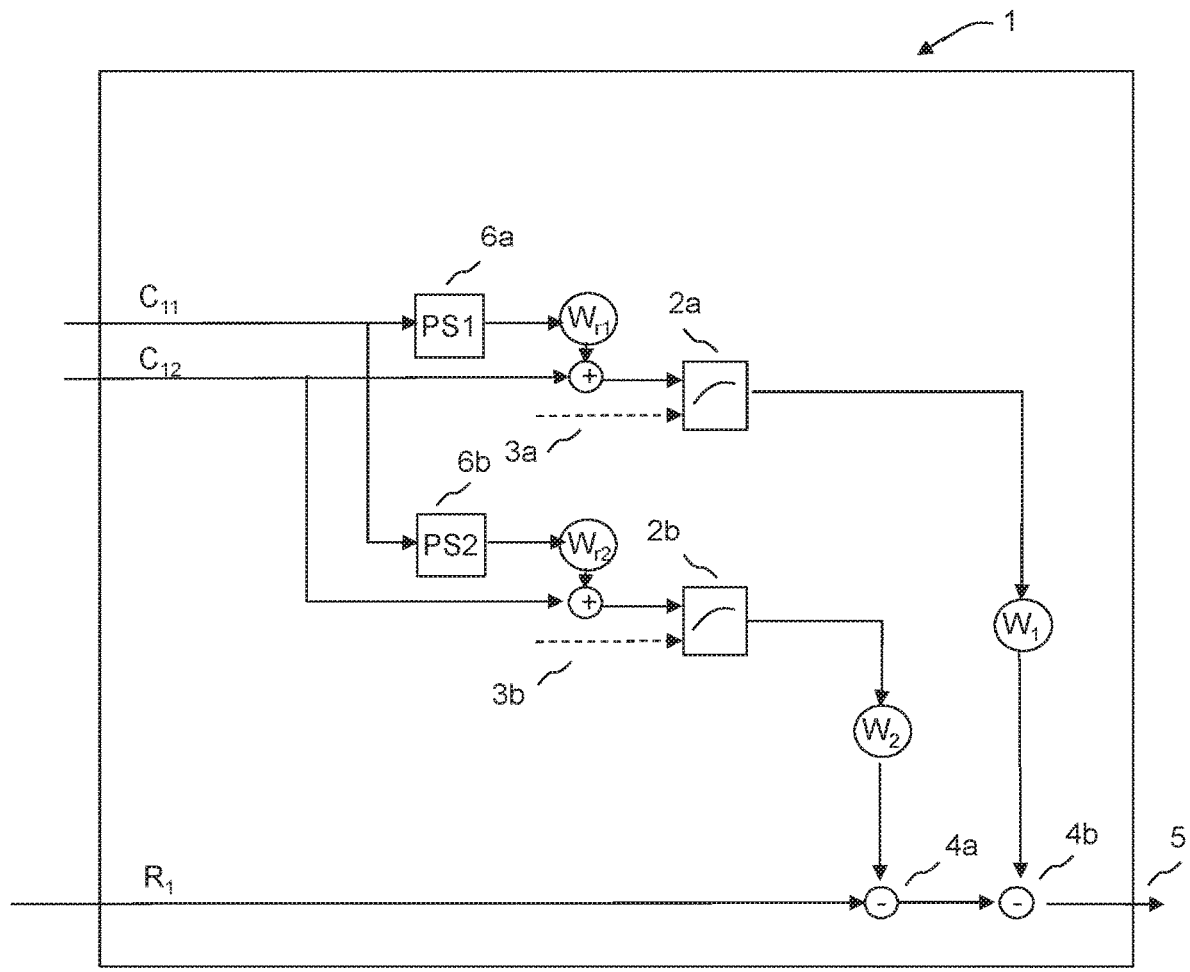
FIG. 2 is a schematic diagram illustrating generation of first and second simulated PIM components, each based on at least a first and second baseband stream representing a respective MIMO component stream, where the first baseband stream is operated on by a different propagation simulation function for each simulated PIM component, in an embodiment of the invention.

As shown in FIG. 2, in an embodiment of the invention, the first simulated PIM component may be generated by a process comprising applying a first propagation simulation function PS1 6a to the first baseband stream, and the second simulated PIM component may be generated by a process comprising applying a second propagation simulation function PS2 6b, again to the first baseband stream, where the first propagation simulation function PS1 is different from the second propagation simulation function PS2. This allows cancellation of interference caused by two or more sources of PIM at different locations, at which the MIMO component streams may arrive after transmission through a different propagation characteristic.

Figure 3:
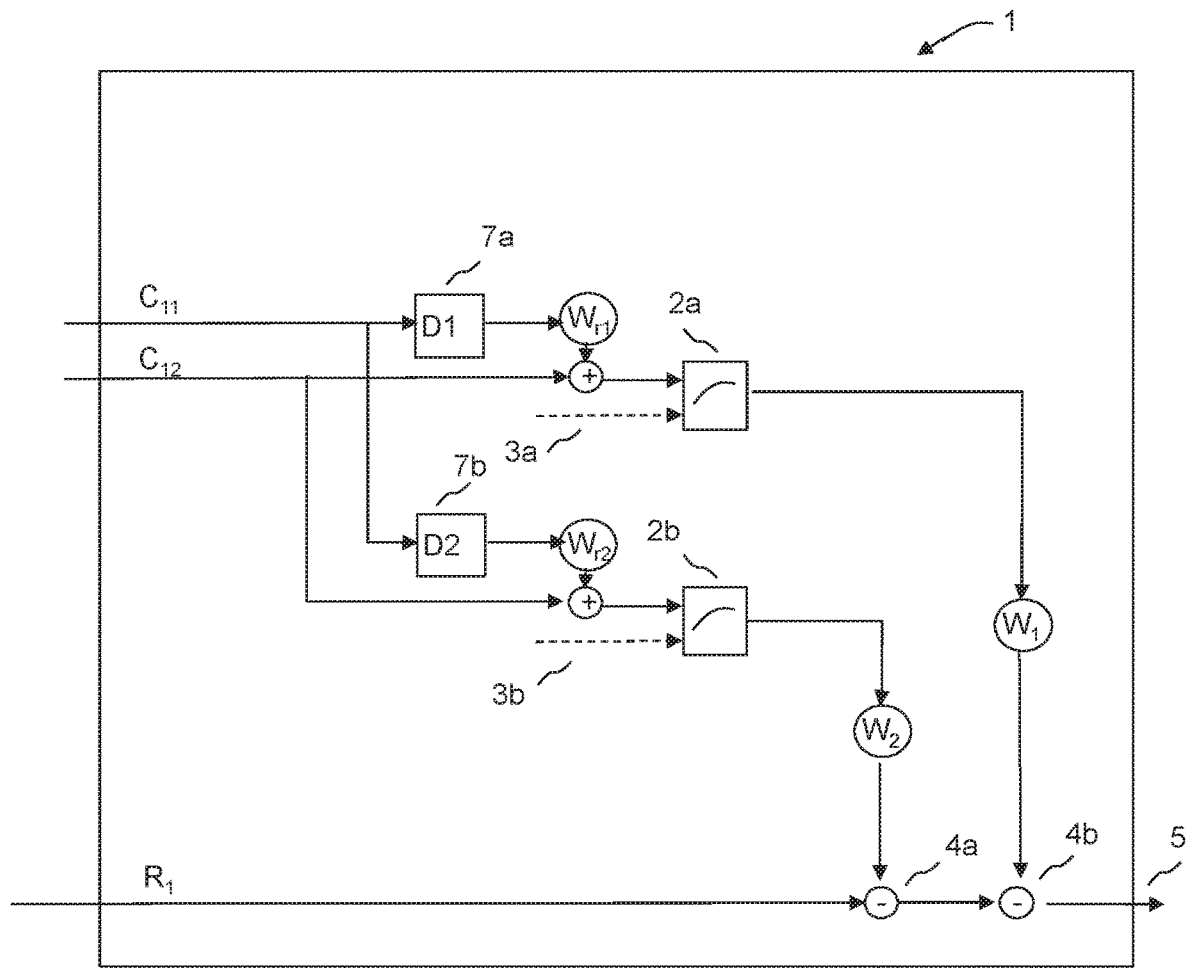
FIG. 3 is a schematic diagram illustrating generation of first and second simulated PIM components, each based on at least a first and second baseband stream representing a respective MIMO component stream, where the first baseband stream is operated on by a different delay for each simulated PIM component, in an embodiment of the invention.

At least one of the first and second propagation simulation functions may comprise a delay. As shown in FIG. 3, both the first and second propagation simulation functions may be delay functions D1 7a and D2 7b. This allows cancellation of interference caused by two or more sources of PIM at different locations, at which the MIMO component streams may arrive with a different delay. The delay values may be found by a search process, based on a correlation of the respective simulated PIM components with the received signal $R_1$.

Figure 4:
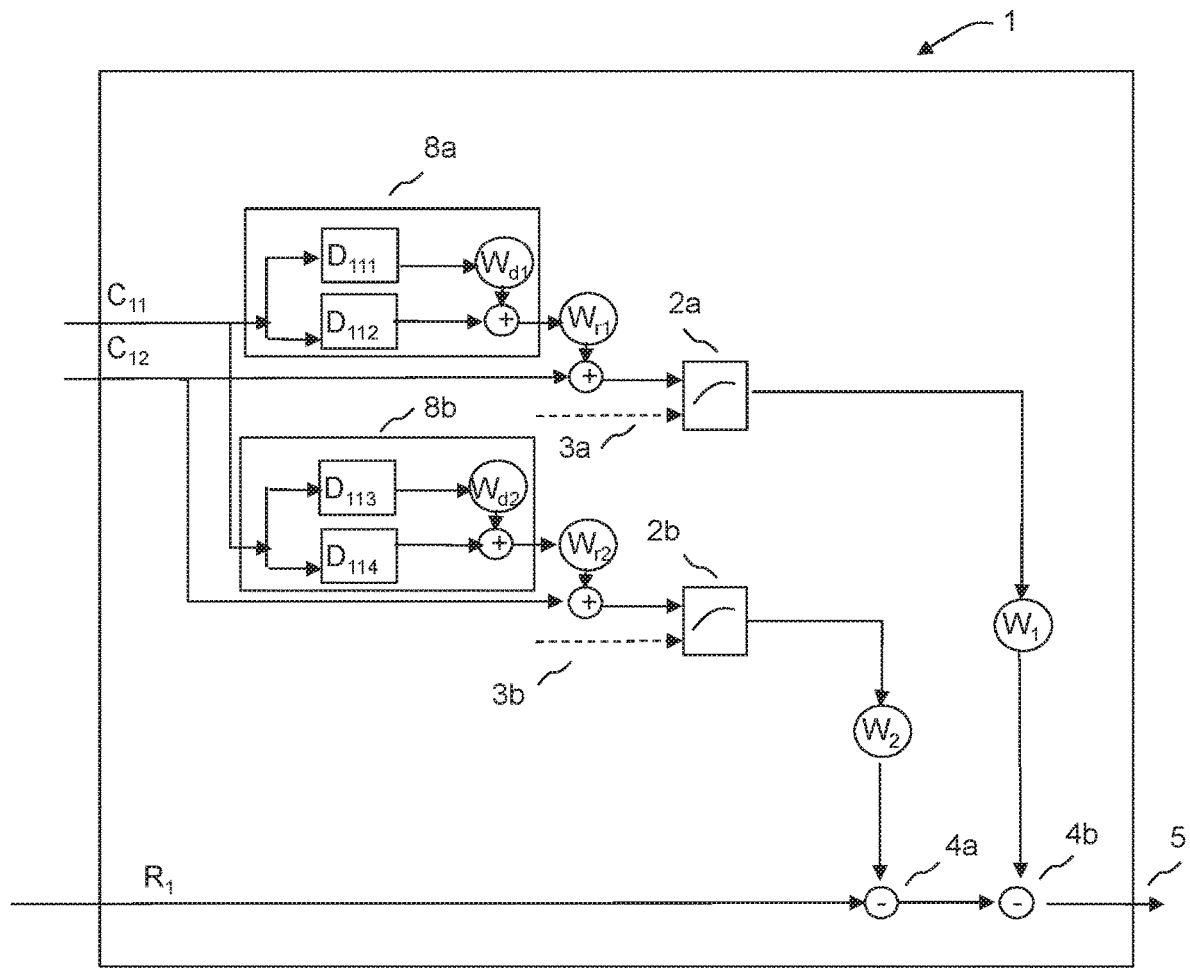
FIG. 4 is a schematic diagram illustrating generation of first and second simulated PIM components, each based on at least a first and second baseband stream representing a respective MIMO component stream, where the first baseband stream is operated on by a different transversal filter for each simulated PIM component, in an embodiment of the invention.

As shown in FIG. 4, the first propagation simulation function 8a may comprise delaying the first baseband stream by a first delay D111, delaying a copy of the first baseband stream by a second delay D112, and combining the first baseband stream with the copy of the first baseband stream with a first phase and amplitude relationship $W_{d1}$.

Similarly, the second propagation simulation function 8b may comprise delaying the second baseband stream by a third delay D113 and delaying a copy of the second baseband stream by a fourth delay D114, and combining the second baseband stream with the copy of the second baseband stream with a second phase and amplitude relationship $W_{d2}$.

This allows cancellation of interference caused by two or more sources of PIM at different locations, at which a MIMO component stream of the first carrier may arrive with a different delay spread due to multipath propagation at each source of PIM. The propagation simulation functions are in effect transversal filter, otherwise known as equalizer, functions, simulating the propagation effects of the respective component streams to the respective PIM sources. A tapped delay line may be used to generate the delays, and delay values may be selected, and appropriate weights applied to each delayed component, to generate simulated PIM to cancel the PIM in the received signal. The delays and weights may be selected by a search process on system start up followed by a tracking phase, which may be based on a correlation with the received waveform.

Figure 5:
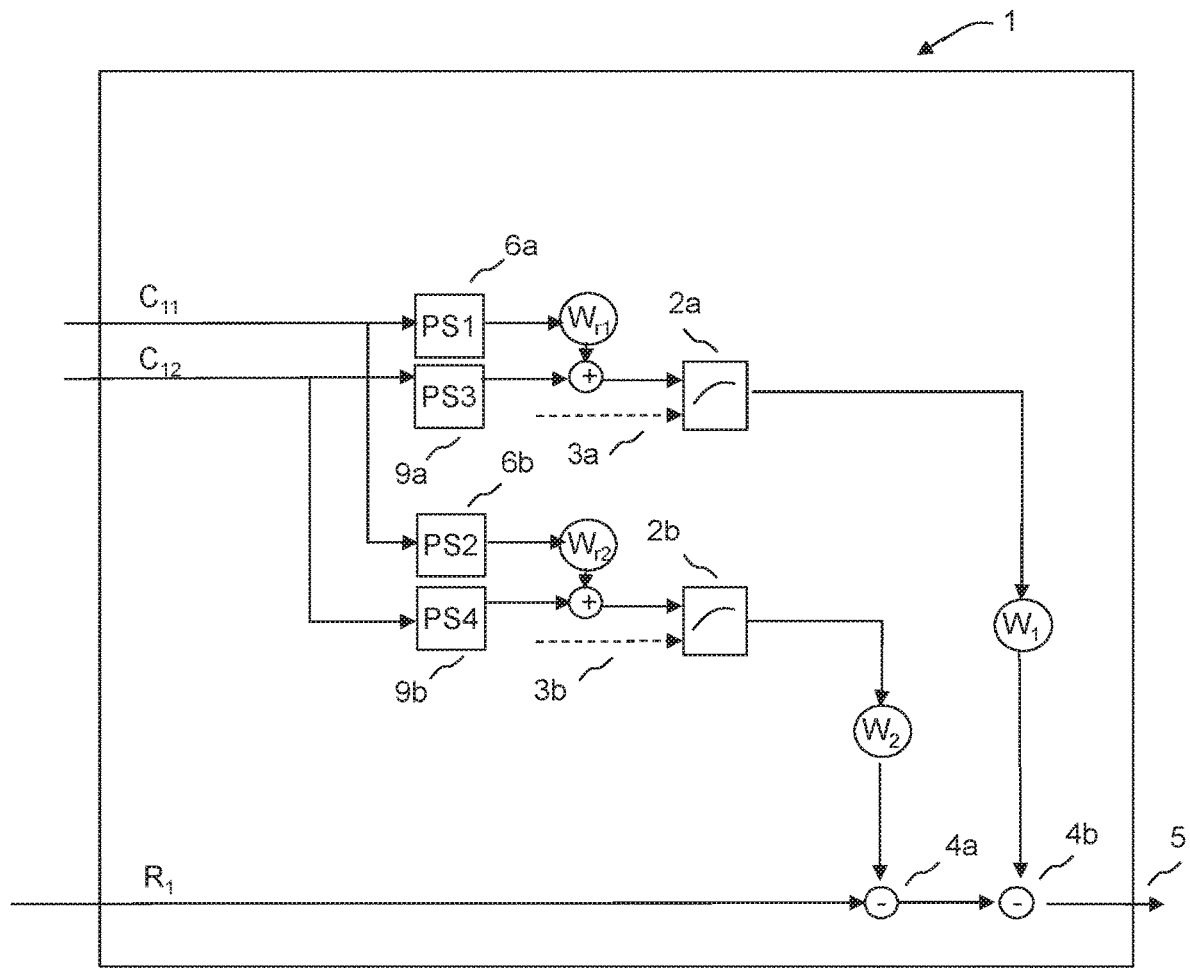
FIG. 5 is a schematic diagram illustrating generation of first and second simulated PIM components, each based on at least a first and second baseband stream representing a respective MIMO component stream, where the first and second baseband streams are each operated on by different respective propagation simulation functions for each simulated PIM component, in an embodiment of the invention.

As shown by FIG. 5, generating the first simulated PIM component may comprise applying a third propagation simulation function PS3 9a to the second baseband stream, and generating the second simulated PIM component may comprise applying a fourth propagation simulation function PS4 9b to the second baseband stream, the third propagation simulation function being different from the fourth propagation simulation function. This allows cancellation of interference caused by two or more sources of PIM at different locations, at which the second MIMO component streams of the first carrier may arrive with a different delay spread due to multipath propagation.

Figure 6:
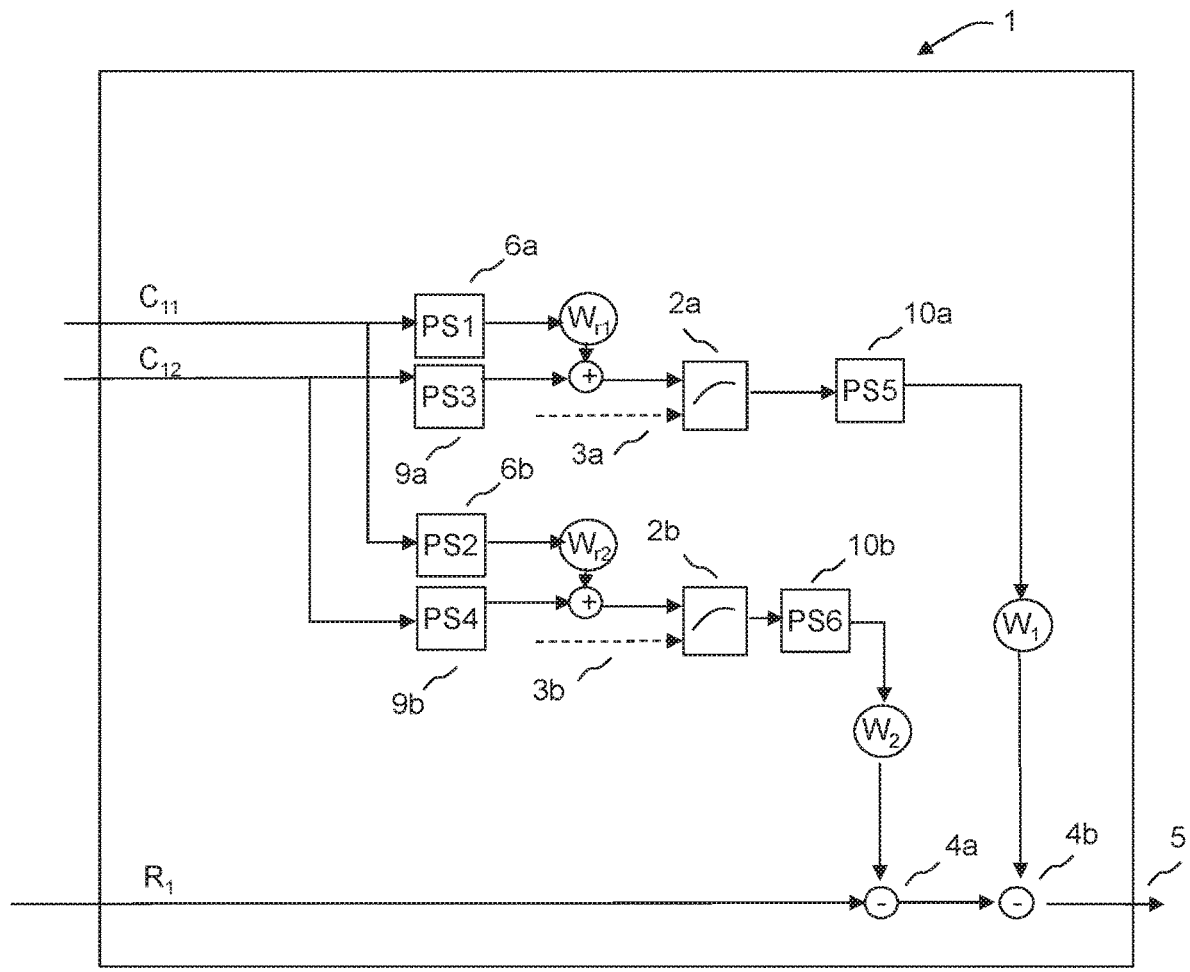
FIG. 6 is a schematic diagram illustrating generation of first and second simulated PIM components, each based on at least a first and second baseband stream representing a respective MIMO component stream, where the first and second simulated PIM components are each operated on by different respective propagation simulation function, in an embodiment of the invention.

As shown by FIG. 6, generating the first simulated PIM component may comprise applying a fifth propagation simulation function PS5 10a to the output of the first nonlinear PIM simulation function, and generating the second simulated PIM component may comprise applying a sixth propagation simulation function PS6 10b to the output of the second nonlinear PIM simulation function, the fifth propagation simulation function being different from the sixth propagation simulation function. This allows cancellation of interference caused by two or more sources of PIM at different locations, generating PIM products which are received at the receiver after transmission through a different propagation characteristic.

As before, the respective propagation simulation functions may be determined by a search process on system start up followed by a tracking phase, which may be based on a correlation with the received waveform.

Figure 7:
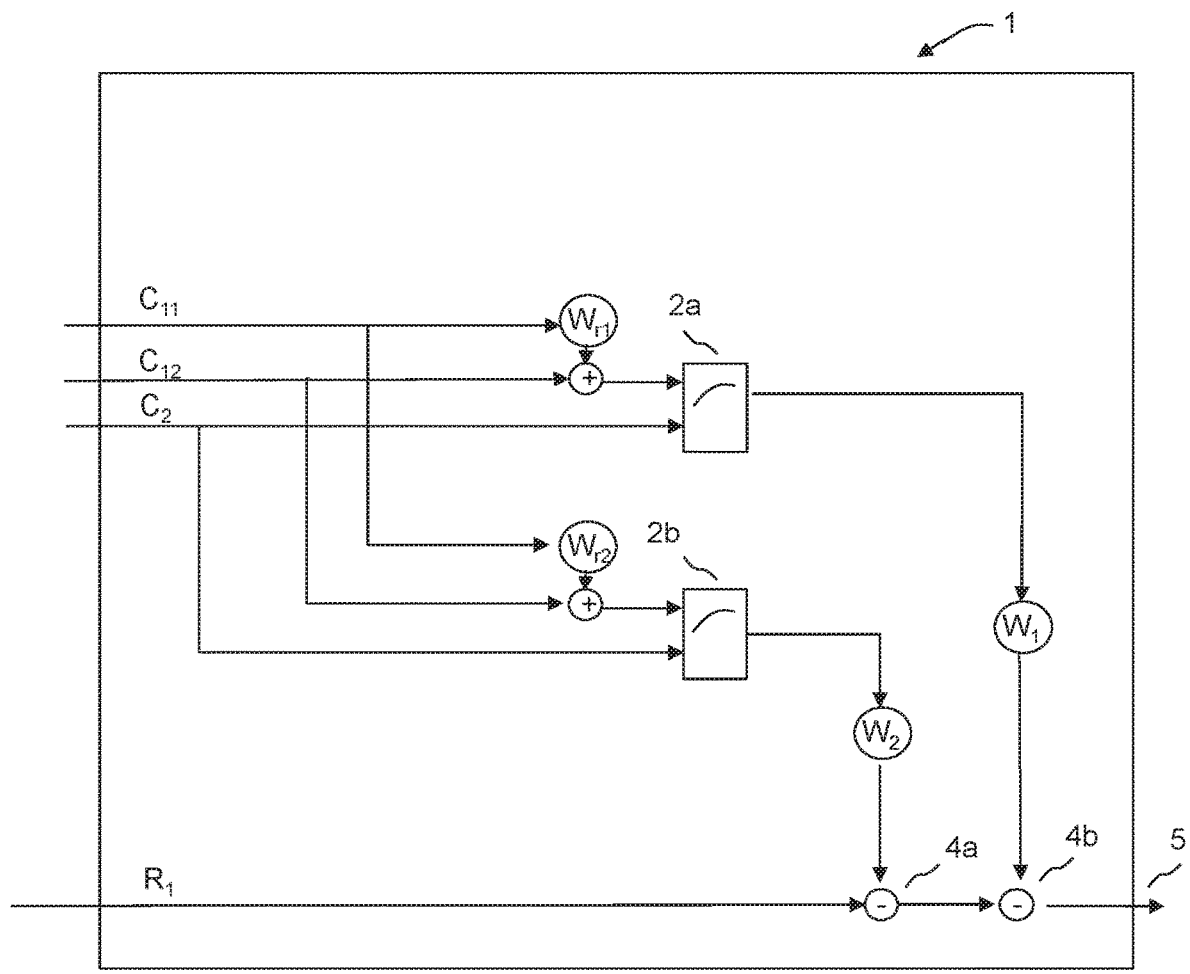
FIG. 7 is a schematic diagram illustrating generation of first and second simulated PIM components, each based on at least a first and second baseband stream representing a respective MIMO component stream at a first carrier frequency and a third baseband stream representing a signal stream at a second carrier frequency.

As shown in FIG. 7, the interference comprising PIM products may be generated from signals comprising a second signal stream at a second carrier frequency $f_2$, and the plurality of baseband streams comprises at least a third baseband stream $C_2$, representing at least part of the second signal stream, offset in frequency at baseband with respect to the first and second baseband streams.

This allows cancellation of PIM generated between carriers at the first and second frequency.

Figure 8:
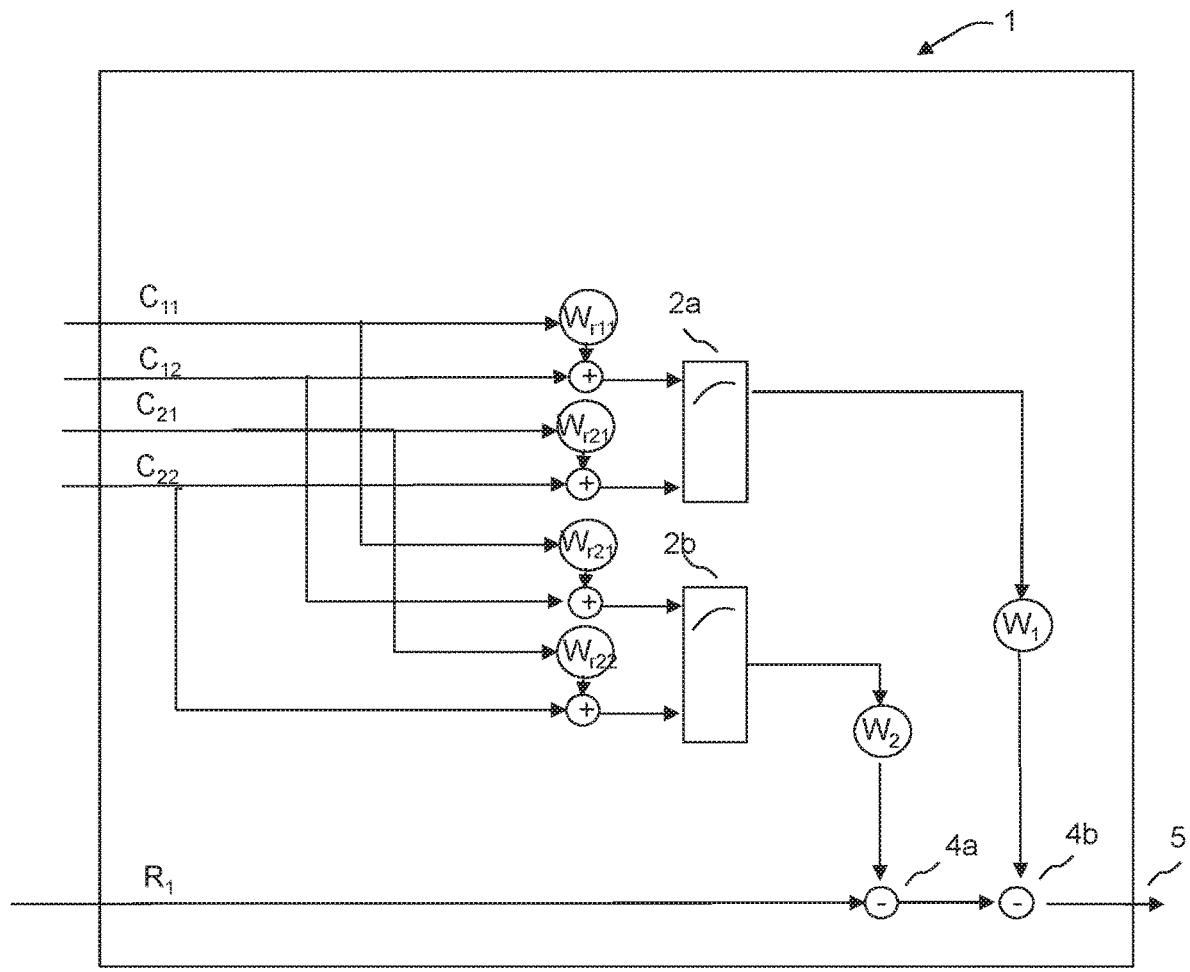
FIG. 8 is a schematic diagram illustrating generation of first and second simulated PIM components, each based on at least a first and second baseband stream representing a respective MIMO component stream at a first carrier frequency and a third and fourth baseband stream each representing a respective MIMO component stream at a second carrier frequency.

As shown in FIG. 8, the second signal stream may comprise at least a third and fourth MIMO component stream at the second carrier frequency, and the plurality of baseband streams comprises streams $C_{21}$ and $C_{22}$ representing the third and fourth MIMO component streams. This allows cancellation of PIM where the second carrier also has MIMO component streams.

Figure 9:
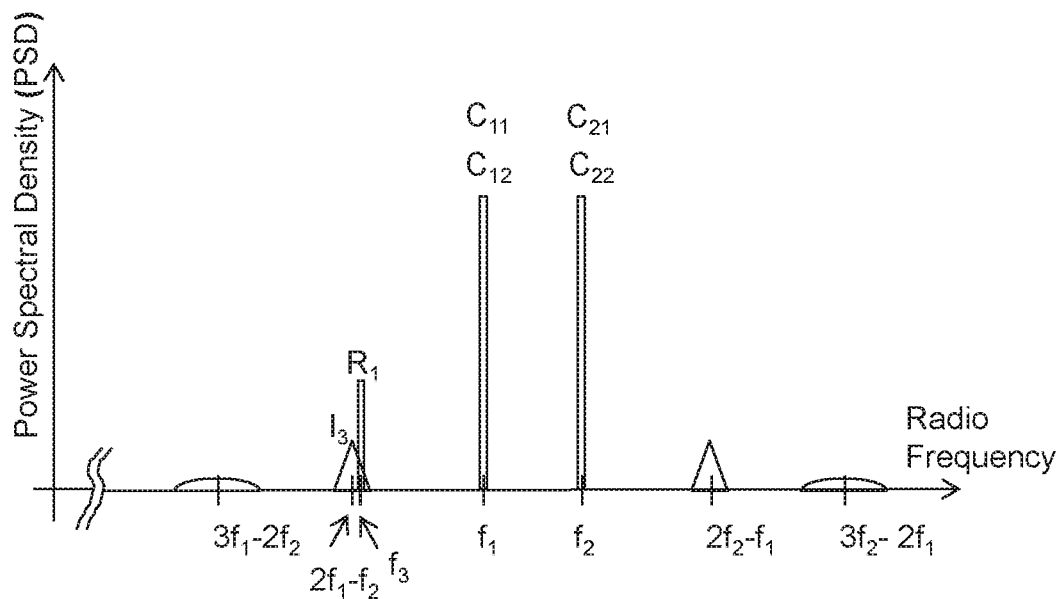
FIG. 9 is a schematic diagram illustrating intermodulation products in the frequency domain at radio frequency.

FIG. 9 is a schematic diagram illustrating intermodulation products in the frequency domain at radio frequency. As can be seen, intermodulation between carriers transmitted at frequencies $f_1$ and $f_2$ may produce PIM at intermodulation frequencies which are the sum and difference frequencies of the fundamental frequencies and multiples of the fundamental frequencies. So, for example, an exponent 3 non-linearity may produce intermodulation at frequencies $2f_1-f_2$ and $2f_2-f_1$, and an exponent 5 non-linearity may produce intermodulation at $2f_1-f_2$ and $2f_2-f_1$ and in addition at $3f_1-2f_2$ and $3f_2-2f_1$, as shown. Many of the intermodulation products may not present a problem in terms of causing interference to a receive signal. However, in the example shown, the PIM product $I_3$ falling at frequency $2f_1-f_2$ overlaps receive frequency band $R_1$ at carrier frequency $f_3$. This product may therefore be simulated and cancelled because it may cause interference to uplink received signals.

Figure 10A:
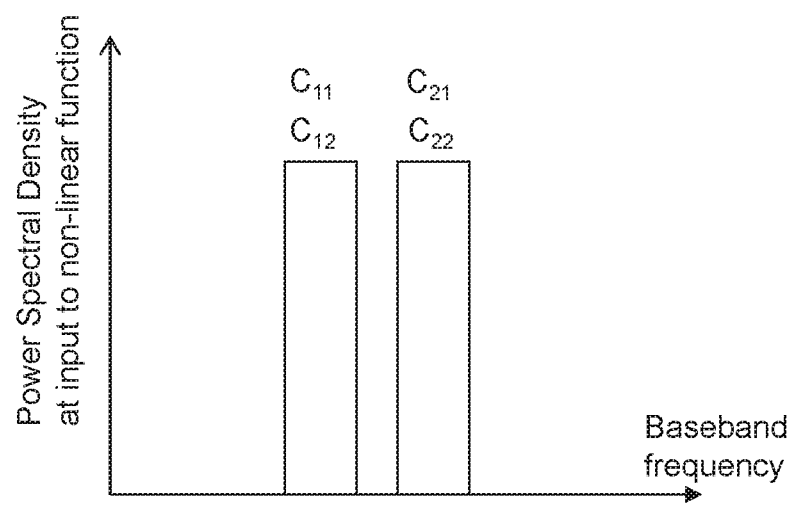
FIGS. 10a and 10b are schematic diagrams illustrating signals at baseband before and after the nonlinear PIM simulation function respectively.
Figure 10B:
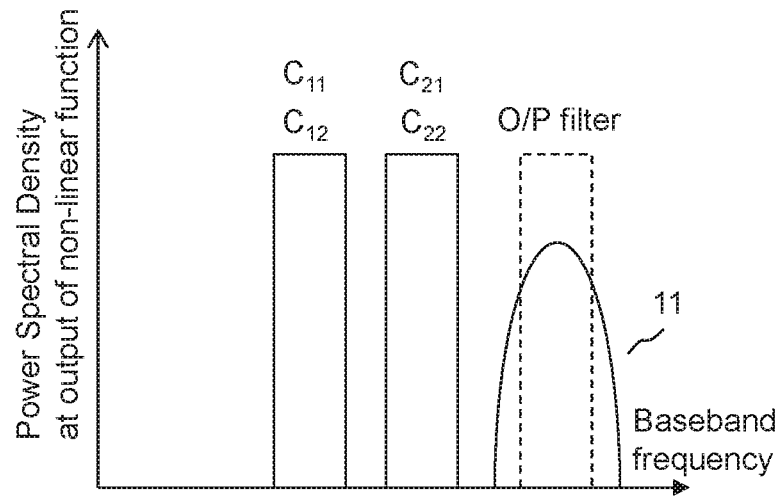

FIGS. 10a and 10b are schematic diagrams illustrating signals at baseband before and after the nonlinear PIM simulation function respectively.

As shown in FIG. 10a, baseband streams C11 and C12 representing MIMO component streams at a first carrier frequency are placed within the baseband spectrum at a baseband frequency offset from the frequency occupied by baseband streams C21 and C22 representing MIMO component streams at a second carrier frequency. The frequency offset at baseband may be different from that at radio frequency, and may be chosen so that the simulated PIM component 11 produced by passing the baseband streams through the nonlinear PIM simulation function is produced at a convenient part of the baseband, as shown in FIG. 10b, so that it may be separated by filtering, and appropriately frequency shifted at baseband for combination with the received signal to cancel the received interference, also within baseband.

Figure 11:
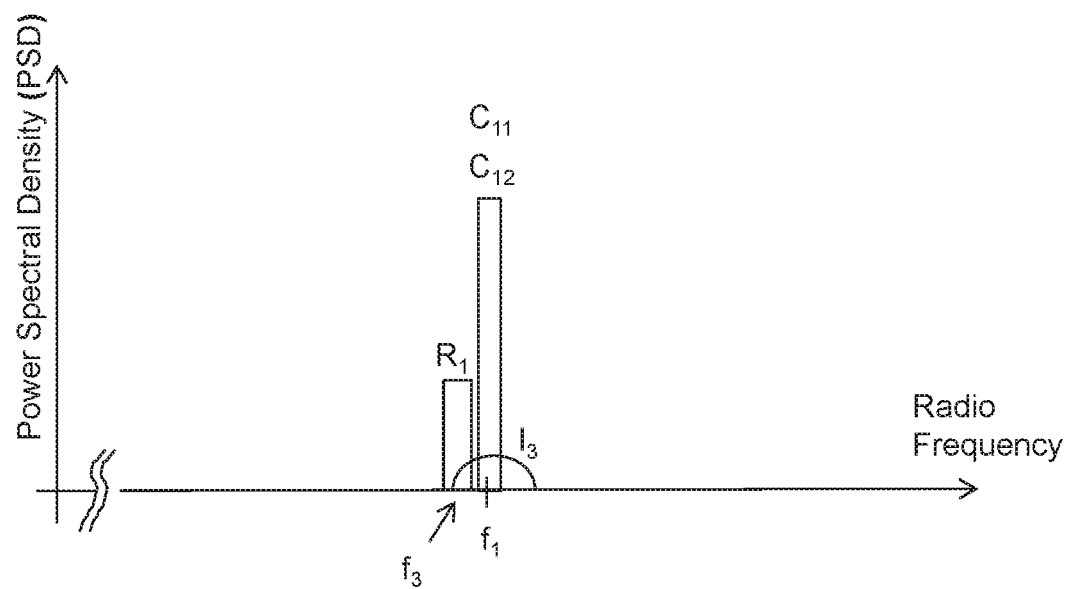
FIG. 11 is a schematic diagram illustrating intermodulation products in the frequency domain at radio frequency where the intermodulation products are generated between parts of signals having the same carrier frequency.

FIG. 11 is a schematic diagram illustrating intermodulation products in the frequency domain at radio frequency where the intermodulation products are generated between parts of signals having the same carrier frequency. This form of PIM may be referred to as IM1. The intermodulation may, for example, be due to intermodulation between subcarriers in an OFDM spectrum. As shown in FIG. 11, intermodulation products $I_3$ may be produced which extend to the band of a receive signal $R_1$ at frequency $f_3$.

Figure 12:
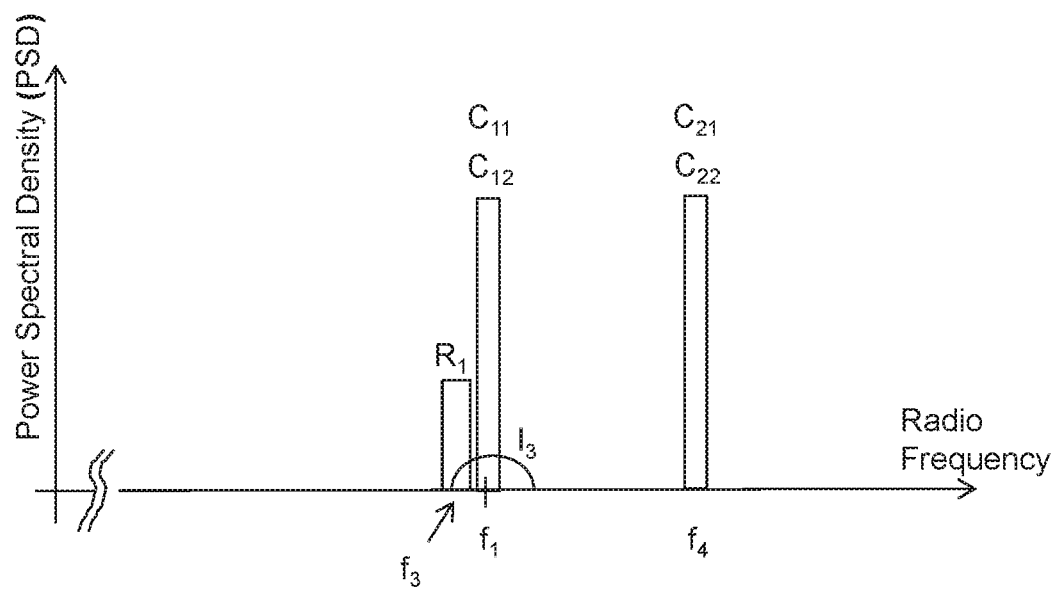
FIG. 12 is a schematic diagram illustrating intermodulation products in the frequency domain at radio frequency where the intermodulation products are generated between parts of signals having the same carrier frequency, cross-modulated by signals at a second carrier frequency.

FIG. 12 is a schematic diagram illustrating intermodulation products in the frequency domain at radio frequency where the intermodulation products $I_3$ are generated between parts of signals $C_{11}$ $C_{12}$ having the same carrier frequency $f_1$, cross-modulated by signals $C_{21}$ $C_{22}$ at a second carrier frequency $f_4$. It has been found that such cross-modulation effects may produce an amplitude modulation of the PIM $I_3$ caused by intermodulation between the signals at the first carrier frequency.

Figure 13A:
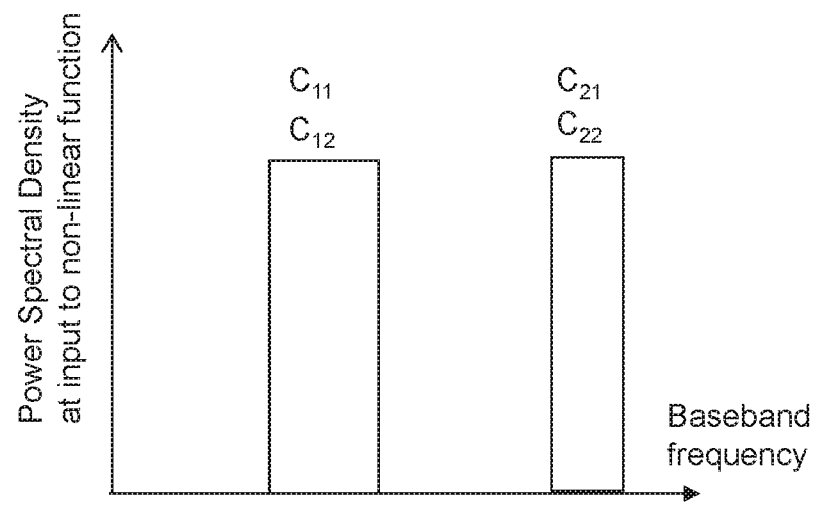
FIGS. 13a and 13b are schematic diagrams illustrating signals at baseband before and after the nonlinear PIM simulation function respectively for the generation of simulated PIM components for the case illustrated by FIG. 12.
Figure 13B:
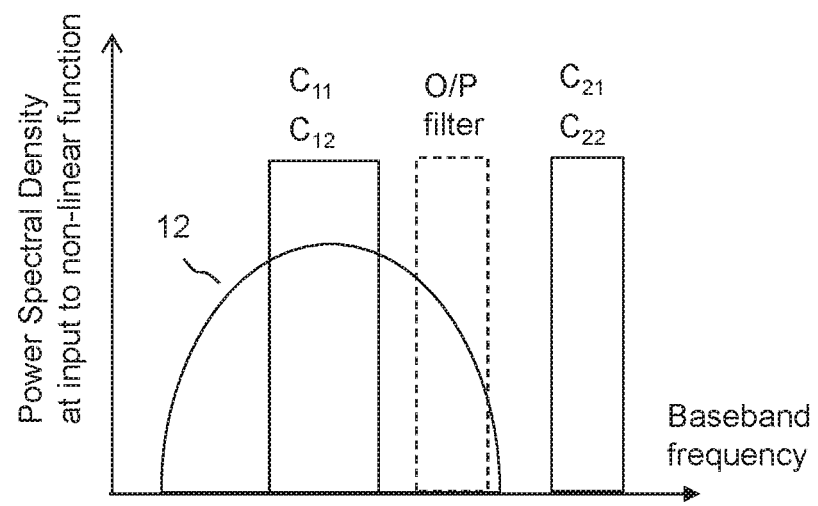

FIGS. 13a and 13b are schematic diagrams illustrating signals at baseband before and after the nonlinear PIM simulation function respectively for the generation of simulated PIM components for the case illustrated by FIG. 12. A baseband representation of the signal $C_2$ or the MIMO components of the signal $C_{21}$ $C_{22}$ causing the cross-modulation may be placed at baseband at a convenient part of the baseband spectrum as shown, avoiding the parts of the spectrum falling in the output filter and the parts of the spectrum occupied by the baseband streams producing the IM1 PIM. The frequency of the PIM products is independent of the frequency spacing of the signal causing the cross-modulation, that is to say $C_{21}$ $C_{22}$ or $C_2$, from the components $C_{11}$ $C_{12}$ at baseband, and this frequency spacing at baseband may be different from the spacing of the corresponding signals at carrier frequency, that is to say at radio frequency. So, at least the third baseband stream may be used to cross-modulate the amplitude of the simulated PIM components. A combination of the third and fourth baseband streams with an appropriate MIMO-mix may be used to cross-modulate the amplitude of the simulated PIM components.

The simulated PIM 12 falling within the output filter will include the effects of cross-modulation. The output filter may be arranged to select the parts of the simulated PIM that may fall in a receive signal band. The selected parts may then be appropriately frequency shifted for combination with baseband representations of the received signal to cancel the interference.

FIG. 14 is a flow diagram of a method of cancelling MIMO PIM interference in an embodiment of the invention, as steps S14.1, S14.2 and S14.3.

In embodiments of the invention, the PIM canceller 1 may be inserted in series with a baseband link between a radio head and a baseband unit, linking the radio head to and from a baseband unit of the cellular radio network, which is typically located in a cabinet on the ground at the base station cell site. The baseband link may be for example a CPRI link as shown or an OBSAI or ORI link. Alternatively, the PIM canceller may access these baseband links at a suitable interface within an integrated unit, for example within the radio head itself. The MIMO component streams $C_{11}$, $C_{12}$ of the first MIMO signal and the MIMO component streams $C_{21}$, $C_{22}$ of the second MIMO signal may be transmitted to the radio head on the baseband link, and the received waveform R1 may be transmitted from the radio head to the baseband unit on the baseband link. In other embodiments, one or more of the MIMO component streams may be received, either over the air or by using an RF coupler, at carrier frequency using one or more radio receivers and converted to baseband. This approach may be used, for example, if access to a baseband link is not available.

The baseband link may be routed through the PIM canceller unit and the signals may be extracted by the PIM canceller unit from the link. The PIM canceller may be a standalone unit comprising a hardware interface to the baseband data links and data processing circuits which may comprise programmable logic. The data processing units or processors may have memory holding executable code configured to cause the PIM canceller unit to perform the method of aspects of the invention. In some embodiments, the PIM canceller may be implemented by software functions arranged to run on a data processor or computer, at a physical location within the radio head, the baseband unit, or remote from the radio head or the baseband unit.

If the relative delays of the data streams, that is to say baseband streams, which mimic the delays of the MIMO component streams are not known a-priori, then these may be determined to generate the simulated PIM. Combinations of amplitudes, phases and delays may be exhaustively searched, and simulated PIM may be generated for each trial combination and correlated with the received PIM to determine whether the trial combination is correct.

The differential delay between baseband streams may be dominated by delays of the digital data streams in addition to the propagation delays of analogue signals. In some cases the delay may be in effect entirely caused by delays of the digital data streams.

The MIMO component streams are designated as signals $C_{11}$, $C_{12}$, $C_{21}$ and $C_{22}$ irrespective of whether the MIMO component streams are represented digitally or in analogue form, and irrespective of the carrier frequency.

In an example of the PIM simulation function, there are at least two inputs which accept a combination of data streams for each carrier frequency, combined with a determined relative amplitude and phase. The two inputs are combined in a combiner function, and the combination is input to a non-linear function. In this example, the non-linear function is of the form $|A|^{n-1}A$, where A is a combined baseband signal comprising the component streams and n is an exponent value chosen to match the PIM product of interest, for example n=3 may be used for PIM products generated at $2f_1-f_2$ or $2f_2-f_1$. In some cases, further products may be generated using n=5, and other exponent values, where fifth, and higher, order products are expected to fall in a band of interest. In one implementation, the data stream representing one MIMO signal may be shifted in frequency within the baseband so as not to overlap the data stream for the other MIMO signal when combined together to be passed through the non-linear function.

The desired non-linear product at the output of the non-linear function may be shifted in frequency within baseband, using a frequency shifting function, to align in frequency with the baseband representation of the received waveform. The simulated PIM products may be filtered using, for example, a low pass filter or a band pass filter, to remove frequency components that are not of interest. The operations within the PIM simulation function are typically performed using complex baseband representations of the signals using Inphase and Quadrature representations. The operations may be performed using a digital signal processor chip, programmable logic, or in software, for example. Applying the PIM simulation function may comprise passing a composite baseband representation of more than one data stream through a non-linear operation, as is described, for example, in the published patent application GB2517298. Applying the PIM simulation function may comprise performing an arithmetic operation on baseband samples from respective data streams. This approach is described, for example, in the published patent GB2502279.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of processing interference in a waveform received at an input of a receiver in a wireless network, the interference comprising PIM (Passive Intermodulation) products generated from at least a first MIMO (Multiple Input Multiple Output) signal comprising at least a first and second MIMO component stream at a first carrier frequency, the method comprising:
generating a first simulated PIM component to simulate a first component of the PIM products by applying a first nonlinear PIM simulation function to a linear combination of a plurality of baseband streams, the plurality of baseband streams comprising at least a first baseband stream representing the first MIMO component stream, a second baseband stream representing the second MIMO component stream, wherein the first baseband stream is combined with the second baseband stream in a first amplitude and phase relationship;
generating a second simulated PIM component to simulate a second component of the PIM products by applying a second nonlinear PIM simulation function to a linear combination of said plurality of baseband streams, wherein the first baseband stream is combined with the second baseband stream in a second amplitude and phase relationship, different from the first amplitude and phase relationship; and
reducing the interference in the received waveform by subtraction of the first and second simulated PIM components.

2. A method according to claim 1, comprising:
generating the first simulated PIM component by a process comprising applying a first propagation simulation function to the first baseband stream; and
generating the second simulated PIM component by a process comprising applying a second propagation simulation function to the first baseband stream,
wherein the first propagation simulation function is different from the second propagation simulation function.

3. A method according to claim 2, wherein at least one of the first and second propagation simulation functions comprises a delay.

4. A method according to claim 3 wherein the first propagation simulation function comprises:
delaying the first baseband stream by a first delay;
delaying a copy of the first baseband stream by a second delay;
combining the first baseband stream with the copy of the first baseband stream with a first phase and amplitude relationship,
and the second propagation simulation function comprises:
delaying the second baseband stream by a third delay;
delaying a copy of the second baseband stream by a fourth delay; and
combining the second baseband stream with the copy of the second baseband stream with a second phase and amplitude relationship.

5. A method according to claim 4, wherein at least the first propagation simulation function is a transversal filter function.

6. A method according to claim 2, wherein:
generating the first simulated PIM component comprises applying a third propagation simulation function to the second baseband stream; and
generating the second simulated PIM component comprises applying a fourth propagation simulation function to the second baseband stream,
wherein the third propagation simulation function is different from the fourth propagation simulation function.

7. A method according to claim 6, wherein generating the first simulated PIM component comprises applying a fifth propagation simulation function to the output of the first nonlinear PIM simulation function, and generating the second simulated PIM component comprises applying a sixth propagation simulation function to the output of the second nonlinear PIM simulation function,
wherein the fifth propagation simulation function is different from the sixth propagation simulation function.

8. A method according to claim 1, wherein the PIM products are generated by intermodulation between signal components having the first carrier frequency.

9. A method according to claim 1, wherein the interference comprising PIM (Passive Intermodulation) products is generated from signals comprising a second signal stream at a second carrier frequency, and said plurality of baseband streams comprises at least a third baseband stream, representing at least part of the second signal stream, offset in frequency at baseband with respect to the first and second baseband streams.

10. A method according to claim 9, wherein the second signal stream comprises at least a third and fourth MIMO component stream at the second carrier frequency.

11. A method according to claim 9 wherein the PIM products are cross-modulated by the second signal stream, and wherein at least the third baseband stream is used to cross-modulate the amplitude of the simulated PIM components.

12. A method according to claim 1, where the nonlinear PIM simulation function is a function of the form $|A|^{p-m}A^m$, where A is a time sample of the linear combination of baseband streams and p is an exponent value of a PIM product and m is a sum of frequency coefficients of the PIM product.

13. Apparatus comprising one or more processors, the apparatus being configured to process interference in a waveform received at an input of a receiver in a wireless network, the interference comprising PIM (Passive Intermodulation) products generated from at least a first MIMO (Multiple Input Multiple Output) signal comprising at least a first and second MIMO component stream at a first carrier frequency, the one or more processors being configured to cause the apparatus to:
generate a first simulated PIM component to simulate a first component of the PIM products by applying a first nonlinear PIM simulation function to a linear combination of a plurality of baseband streams, the plurality of baseband streams comprising at least a first baseband stream representing the first MIMO component stream, a second baseband stream representing the second MIMO component stream, wherein the first baseband stream is combined with the second baseband stream in a first amplitude and phase relationship;
generate a second simulated PIM component to simulate a second component of the PIM products by applying a second nonlinear PIM simulation function to a linear combination of said plurality of baseband streams, wherein the first baseband stream is combined with the second baseband stream in a second amplitude and phase relationship, different from the first amplitude and phase relationship; and reduce the interference in the received waveform by subtraction of the first and second simulated PIM components.

* * * * *